No. 811,117. PATENTED JAN. 30, 1906.
T. M. ANDREWS.
VALVE FOR ENGINES.
APPLICATION FILED JULY 13, 1905.

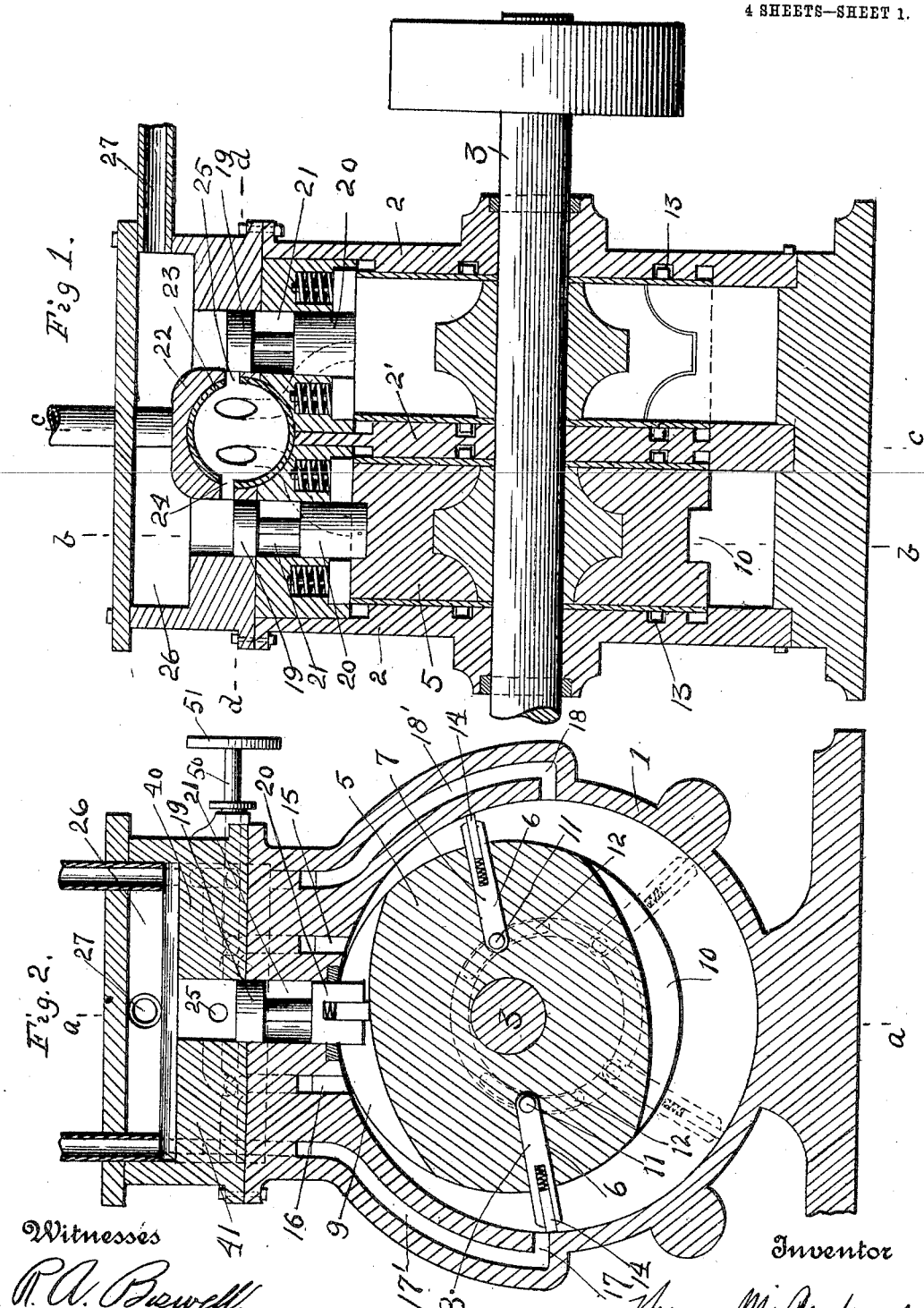

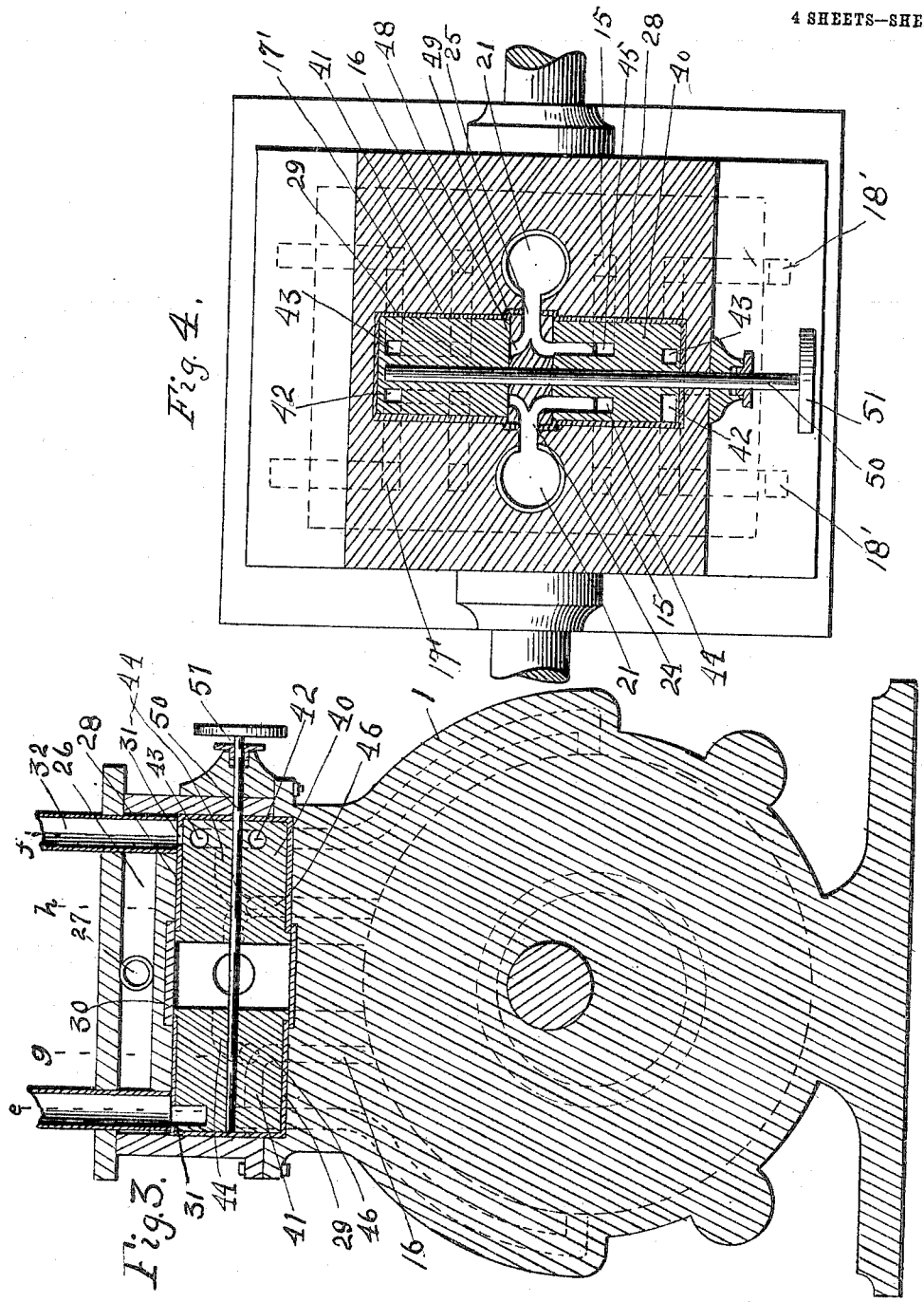

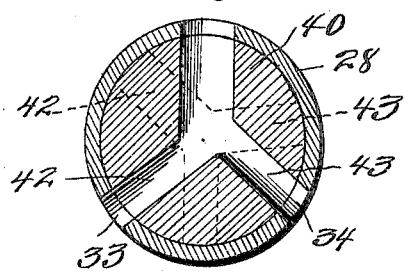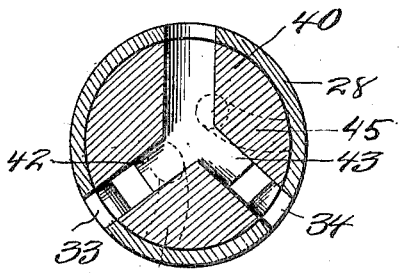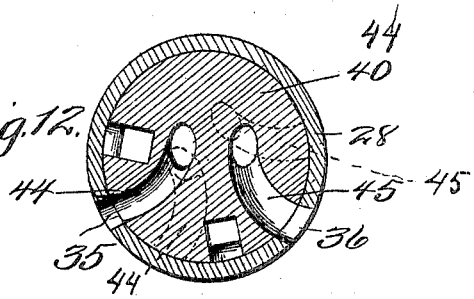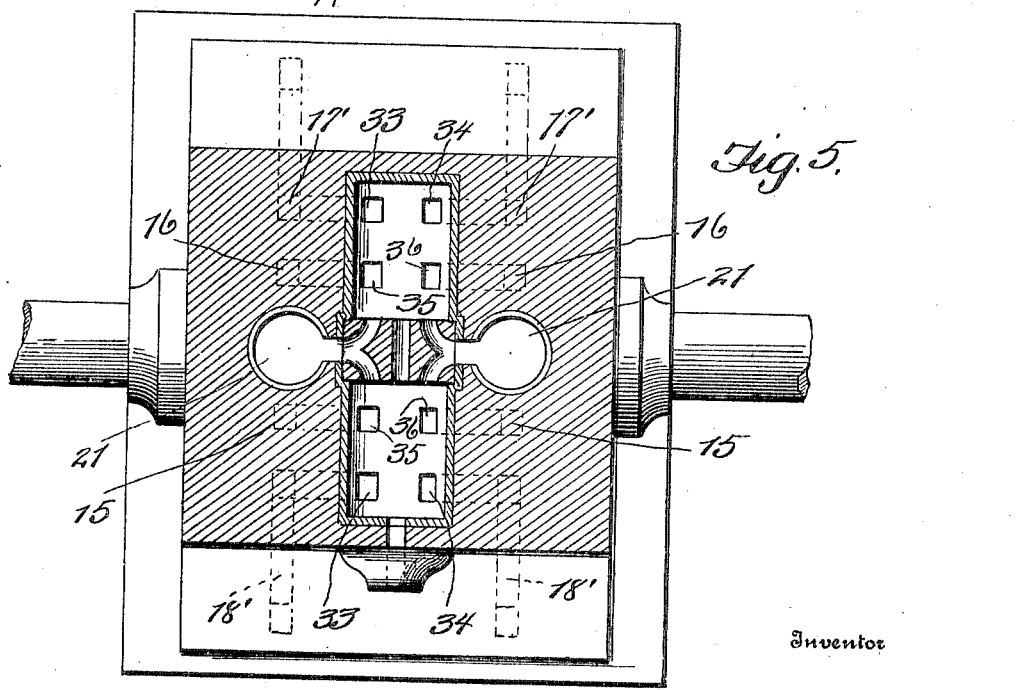

4 SHEETS—SHEET 4.

Witnesses
R. A. Boswell
Albert Popkins

Inventor
Thomas M. Andrews
By Sturtevant & Greeley
Attorney

UNITED STATES PATENT OFFICE.

THOMAS M. ANDREWS, OF NASHVILLE, TENNESSEE.

VALVE FOR ENGINES.

No. 811,117.  Specification of Letters Patent.  Patented Jan. 30, 1906.

Application filed July 13, 1905. Serial No. 269,483.

*To all whom it may concern:*

Be it known that I, THOMAS M. ANDREWS, a citizen of the United States, residing at Nashville, in the county of Davidson, State of Tennessee, have invented certain new and useful Improvements in Valves for Engines, of which the following is a description, reference being had to the accompanying drawings and to the figures of reference marked thereon.

My invention relates to valves for controlling steam or other engines, and has for its object to provide in connection with a pair of steam or other engines arranged on the same shaft a rotary valve adapted to control both engines simultaneously, so that when desired the steam or other driving medium may be admitted to both engines to drive them in the same direction, or the supply of steam may be cut off or restricted or the direction of rotation of the engines may be reversed.

With these objects in view my invention consists in the combination, with a pair of engines arranged on the same shaft, of a rotary controlling-valve having ports arranged, as hereinafter described, so that when turned to one position steam may be admitted to the engines to drive them in one direction, and when turned to another position steam will be admitted to the engines to drive them in the opposite direction, and when turned to a third position the steam will be cut off from the engines.

While the valve which forms the subject of this application may be adapted to engines of various construction, I have here shown and described it as used in connection with a pair of rotary engines of the general type shown in the patent granted to me June 30, 1903, No. 732,671.

Figure 6:
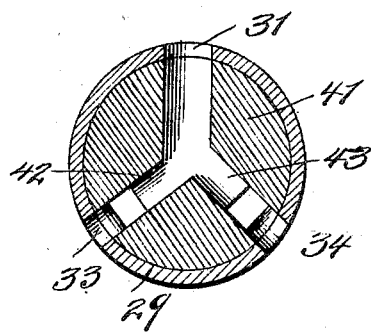
Figure 7:
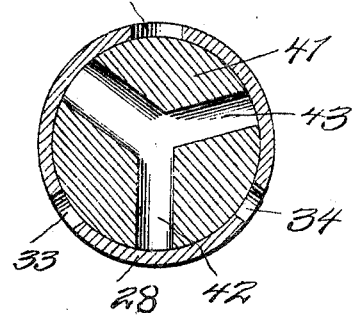
Figure 8:
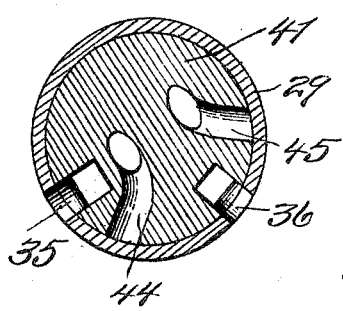
Figure 9:
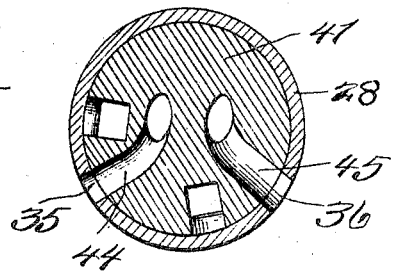

Referring to the drawings, Figure 1 is a cross-sectional view on the vertical plane of the center of the shaft, the plane being indicated on Fig. 2 by the line *a a*. Fig. 2 is a cross-sectional view on the vertical plane indicated by line *b b* of Fig. 1. Fig. 3 is a cross-sectional view on the vertical plane indicated by line *c c* of Fig. 1. Fig. 4 is a cross-sectional view on the horizontal plane indicated by the line *d d* of Fig. 1. Fig. 5 is a cross-sectional view on the same plane as that of Fig. 4 with the valve-plug removed to show the arrangement of the parts in the casing. Figs. 6 and 7 are cross-sectional views of the valve and its shell, on an enlarged scale, taken on the planes indicated by lines *e* and *f*, respectively, of Fig. 3. Figs. 8 and 9 are similar views taken on planes indicated by lines *g* and *h*, respectively, of Fig. 3. Fig. 10 is a cross-sectional view of the valve and its shell, taken on the plane of line *f* of Fig. 3, showing the valve in its second or reversing position and showing in dotted lines the passages 42 43 of the rear portion of the valve. Fig. 11 is a cross-sectional view similar to Fig. 10, but showing in dotted lines the passages 44 45 of the forward portion of the valve; and Fig. 12 is a cross-sectional view on the plane of line *h* of Fig. 3, showing in dotted lines the passages 44 45 of the rear portion of the valve.

In the drawings, 1 is a cylindrical casing having outer heads 2. A central partition 2' separates the casing into two cylinders. A power-shaft 3 is carried in bearings arranged above the centers of the heads 2, the shaft also having a bearing in the partition 2'. Within each of the cylinders and secured to the power-shaft and concentric therewith is a piston-disk 5, having oppositely-extended openings 6, in which are carried piston-wings 7 and 8. The corresponding piston-wings of the two cylinders are arranged at approximately an angle of ninety degrees to each other, so that, as hereinafter described, as a piston-wing of one cylinder is passing the escape-outlet the corresponding piston-disk of the other cylinder is in position to be acted on by steam admitted to its cylinder. The openings 6 in the piston-disk, in which the piston-wings 7 and 8 are carried, are arranged diametrically opposite to each other. In the face of the piston-disk of each of the cylinders is formed the oppositely-located eccentric grooves 9 and 10. These grooves are so located that they have their greatest depth at points intermediately between the openings 6 and taper in both directions from these points. As the corresponding piston-wings of the two cylinders are arranged at an angle of ninety degrees to each other, it follows that the grooves 9 and 10 of the piston-disk of one cylinder will be arranged at approximately an angle of ninety degrees to the corresponding grooves of the piston-disk of the other cylinder.

The piston-wings 7 and 8 are provided, preferably on each side near their inner ends, with pins 11, which carry curved guides 12, which travel in grooves 13, formed in the inner faces of the heads 2 and in the opposite sides of the partition 2' concentric with the inner periphery of the cylinders, but eccentric to the bearings 4. The piston-wings are provided at their outer ends with a packing, preferably consisting of a plate 14, spring-pressed outward to make a tight joint with the inner periphery of the cylinders.

The cylinders are each provided with inlet-ports 15 16 for the admission of the steam or other motor fluid and outlet-ports 17 18, the inlet-port 15 and the outlet-port 17 being used when the engine is driven in one direction and the inlet 16 and outlet 18 being used when the engine is to be driven in the other direction, the admission of the steam or other motor fluid to the inlet-ports and its escape from the outlet-ports being controlled by the valve which forms the subject-matter of this application. Between the inlet-ports 15 and 16 in each cylinder is located a valve 19, provided with an extension 20, which is adapted to extend into the grooves 9 and 10 of the piston-disks 5, the rotation of the piston-disks serving to reciprocate the valves 19 to control the admission of the motor fluid to the respective cylinders. The valves 19 reciprocate in passages 21, formed in the cylinders. Between the passages 21, in which the valves 19 reciprocate, and in line with the partition 2' between the two cylinders is a casing 22, preferably formed integrally with the cylinders and having therein a cylindrical opening 23, communicating by passages or ports 24 25 with the passages 21, in which the valves 19 are located, the passages or ports 24 25 being controlled by the valves 19.

26 is a steam-chest into which the passages 21 open at their upper end and through which steam is supplied, as hereinafter described.

27 is the inlet-pipe for admitting steam or other motor fluid to the steam-chest.

Within the cylindrical opening 23 in the casing 22 is a shell or lining formed in two parts 28 29, connected by ring 30. The forward part 28 is provided near its forward end with an upper port or opening 31, communicating with the escape-pipe 32 and with two openings 33 34 on opposite sides below the plane of the center. It is also provided near its rear end with two openings 35 36 on opposite sides below the plane of its center. The rear part 29 of the shell is provided with similar ports or openings 31, 33, 34, 35, and 36, except that they are reversely located, the ports or openings 31, 33, and 34 being near the rear end and the ports or openings 35 and 36 being near its forward end. The ports 33 34 of the forward part 28 communicate with passages 18', leading from the outlet-ports 18 of the two cylinders, and the ports 33 34 of the rear part 29 communicate with the passages 17', leading from the outlet-ports 17 of both cylinders. The ports 35 36 of the forward part 28 communicate with passages leading to the inlet-ports 15, and the ports 35 36 of the rear part communicate with the inlet-ports 16.

Within the shell 28 29 is located a valve comprising a forward part 40 and a rear part 41, the forward part being adapted to rotate within the forward part 28 of the shell and the rear part 41 being adapted to rotate in the rear part 29 of the shell. The forward part 40 is provided near its forward end in line with the ports 31, 33, and 34 of the part 29 of the shell with passages 42 43, uniting at their upper ends and diverging at their lower ends, their lower ends being so spaced that when the valve is in one position they will be in register with the ports or openings 33 and 34, and at the same time their united upper ends will be in register with the port or opening 31. Toward its rear the part 40 is provided in line with the ports or openings 35 36 with passages 44 45, leading inward and thence leading rearward and opening at their rear ends into the space between the two parts 40 and 41 of the valve. The passages are so located in the part 40 that when the valve is turned to its second position their forward ends will be in register with the ports or openings 35 36. Also in line with the ports or openings 35 36 the forward part 40 is provided with passages 46 47, leading inward and thence forward and communicating with the passages 42 43. The rear ends of these passages 46 47 are so located that when the valve is in its first position they will be in register, respectively, with the ports or openings 35 36. The rear part 41 of the valve is provided with similar passages 42, 43, 44, 45, and 46 47, except that these passages are reversely arranged, the passages 42 43 being near the rear end of the part 41 and the peripheral openings of the passages 44 45 and 46 47 being toward the forward end of the part 41.

The peripheral openings of the several passages 42, 43, 44, 45, and 46 47 of the two parts 40 and 41 are not in line; but the peripheral openings of the passages 42 43 of one part are in line with the peripheral openings of passages 44 45 of the other part, so that when the peripheral openings of the passages 42 43 of one part are in line with ports or openings 33 34 of the corresponding part of the shell the peripheral openings of passages 44 45 of the other part of the valve will be in register with the ports or openings 35 36 of the other part of the shell.

The parts 40 and 41 are spaced apart in any convenient manner, as by a bar or block 48, which serves as a partition between the ends of the passages 44 45, and are held in position in the parts 28 29 of the shell by rings 49, which also serve as packings to prevent leakage of steam between the parts of the valve and the parts of the shell in which they are located.

For the purpose of rotating the valve a shaft or rod 50 extends through both parts 40 and 41 and is provided on its forward end with a wheel or handle 51 for convenience in operating the valve. A suitable packing-box 52 surrounds the rod 50 near its outer end to prevent leakage.

While I prefer to use the shell 28 29, as above described, it should be understood that this may be dispensed with.

When it is desired to drive the engine forward, the valve 40 41 is so rotated by means of the wheel or handle 51 that the peripheral openings of the passages 44 45 of the forward part 40 of the valve will be in register with the ports or openings 35 36 of the forward part of the shell leading to the inlet-ports 15 of the cylinders, and the peripheral openings of the passages 42 43 of the rear part 41 of the valve will be in register with the ports or openings 33 34 leading from the outlet-ports 17 of the cylinders. Steam or other motor fluid from the steam-chest 26 through one or the other of ports 53 as it is uncovered by the downward movement of one of the valves 19 and through the passage 44 or 45, as the case may be, passes through the port or opening 33 or 34, as the case may be, into the inlet 15 of one or the other of the cylinders, and by its action against the wings or pistons 6 7 rotates the piston-carrier, and with it the engine-shaft. As the shaft carrying the piston-carriers rotates, the valve 19, which was first in depressed position, is lifted, cutting off the supply of steam from its cylinder, and the valve 19 of the other cylinder is allowed to descend, uncovering the port 53, through which steam enters, and through the passage 45 or 44 enters the inlet 15 of the other cylinder. As soon as the piston-carrier is rotated sufficiently to carry the wing or piston 6 or 7 past the port 17 the steam escapes through this port and through the passage 17', the port or opening 33 or 34, as the case may be, and the passage 42 or 43, as the case may be, out through the port or opening 31 into the rear escape-pipe. Any steam which may be in advance of the wing or piston 8 after it passes the outlet-port 17 will escape through the inlet-ports 16, the ports or openings 35 36, the passages 46 47, into the passages 42 43 of the part 41 of the valve. When it is desired to reverse the engine, the wheel or handle 51 is turned to rotate the parts 40 and 41, so that the passages 42 43 of the forward part 40 will communicate with the passage 18' of the outlet-port 18 and the passages 44 45 of the rear part 41 will be in communication with the inlet-ports 16. Steam will then enter through the inlet-ports 16 against the rear faces of the wings or pistons 7 8, driving the pistons or wings in reverse direction.

It will of course be understood that I do not desire to be limited to the precise construction shown and described, as the construction may be varied without departing from the spirit of the invention.

Having thus described my invention, what I claim as new, and desire to secure by Letters Patent, is—

1. In a rotary engine, the combination with a pair of cylinders provided with piston-carriers arranged on a common shaft, and each provided with a pair of inlet-ports and a pair of outlet-ports, of a single valve adapted when in one position to admit motor fluid to one of the inlet-ports of each cylinder, and to permit the motor fluid to escape from the corresponding outlet-port of each cylinder, and when in another position, to permit the motor fluid to enter the other inlet-ports of the cylinders and to escape from the corresponding outlet-ports.

2. In a rotary engine, the combination with a pair of axially-alined cylinders each provided with a pair of inlet-ports and a pair of outlet-ports, of a reciprocatory valve for each cylinder, a piston-carrier in each cylinder constructed and adapted to actuate in its rotation the corresponding reciprocatory valve, a rotatable valve arranged between said reciprocatory valves and to which the latter alternately admit the motive fluid, said rotatable valve being provided with a central aperture to which the steam is admitted and with passages leading from said central aperture and adapted to admit steam in one position of said valve to one of the said ports and the other inlet-port of each cylinder and in another position of said valve to admit steam into said last-mentioned inlet-port and exhaust steam from the other of said outlet-ports and said first-mentioned inlet-port.

3. In a rotary engine, the combination with a pair of axially-alined cylinders, a steam-chest above said cylinders, a valve-casing provided with exhaust-ports and passages communicating with said steam-chest, a pair of reciprocatory valves adapted to alternately open and close said passages, a piston-carrier in each cylinder provided with cam-surfaces adapted to actuate said valves, a rotatable valve within said casing provided with a central aperture to which the steam is admitted and with passages leading from said aperture and so arranged that in one position of said valve steam is admitted into one inlet-port and exhausted from the other inlet-port and one outlet-port of each cylinder and in the other position of said valve steam is admitted into said last-mentioned inlet-port and exhausted from the other inlet-port and the other outlet-port of each cylinder and manually-operable means to operate said valve.

In testimony whereof I affix my signature in presence of two witnesses.

THOS. M. ANDREWS.

Witnesses:
H. W. BRANDHORST.
LEWIS B. COOK.